D. B. Cobb,
Door Knob.

No. 68,956.     Patented Sep. 17, 1867.

Witnesses:
Theo Inscho
W. Trewrn

Inventor:
D B Cobb
Per Murny
Attorney

United States Patent Office.

D. B. COBB, OF JERSEY CITY, NEW JERSEY.

Letters Patent No. 68,956, dated September 17, 1867.

IMPROVEMENT IN ATTACHING DOOR-KNOBS.

*The Schedule referred to in these Letters Patent and making part of the same.*

TO ALL WHOM IT MAY CONCERN:

Be it known that I, D. B. COBB, of Jersey City, in the county of Hudson, and State of New Jersey, have invented a new and useful Improvement in Securing Door or other Knobs to metal shanks and attaching the same to spindles or arbors of locks; and that the following description, taken in connection with the accompanying drawings, hereinafter referred to, forms a full and exact specification of the same, wherein I have set forth the nature and principles of my said improvements, by which my invention may be distinguished from all others of a similar class, together with such parts as I claim and desire to have secured to me by Letters Patent.

This invention relates to a new and improved method of securing in a durable and simple manner door and other knobs made from ebony and other woods, hard rubber, gutta percha, or other materials, to metal shanks, and also in attaching the same to lock-spindle or arbor, as hereinafter fully shown and described, whereby a very strong and durable connection of the aforesaid parts is obtained, and one which admits of a very ornamental and chaste appearance being given the knob, and rendering polishing (by which the silver plating on plated door-knobs is rapidly worn away) unnecessary. In the accompanying sheet of drawings—

Similar letters of reference indicate like parts.

Figure 1:
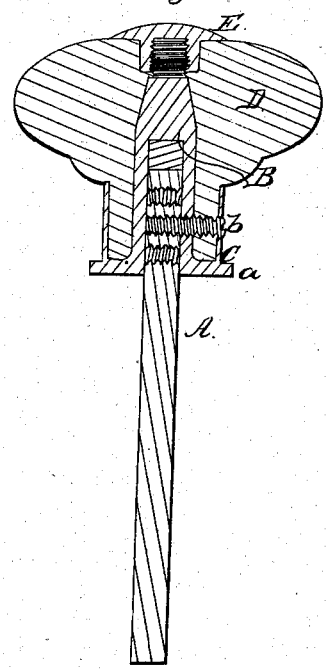
Figure 1 is a longitudinal section of a knob and shank with an ordinary lock-spindle or arbor attached, the securing of the knob to the shank and manner of adapting the shank to the spindle being according to my invention.
Figure 2:
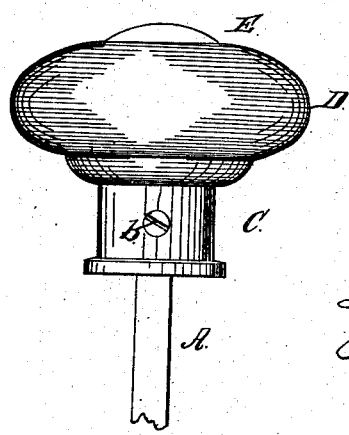
Figure 2 is an external view of the same.

A represents the arbor or spindle of a lock, which may be constructed in the usual way. B is a metal shank having a square interior to receive the arbor or spindle A. The shank B may be cast or formed in any other way with the socket C at its inner end, said sockets being of cylindrical form, with a flange, $a$, at its inner end, and having its interior of annular form to receive the front end of the knob D, the knob D being bored centrally to receive the shank B, the outer end of the latter having a screw-thread cut upon it, on which a nut, E, is fitted, the nut E assisting in holding the knob on the shank. The arbor or spindle A is secured in the shank B by a screw, $b$, which passes through the socket C, front end of knob D, and shank B, and into any of a series of holes in the arbor or spindle A, as shown in fig. 1, the screw $b$ securing the knob to the arbor or spindle A, besides assisting in securing the knob to the shank B. The square hole in the shank B is made deep enough to admit of adjusting the knob on the arbor or spindle A to suit doors of various thicknesses, as is usual with other combinations of knobs and spindles.

The knob and shank can be secured very firmly together, as will be seen, and as follows: first, by driving the shank hard home over the front portion of knob fitting into the annular space or socket C; second, by the friction of the upper edge of the socket C, which friction may be increased by milling the aforesaid edge, and thereby offering great resistance to the knobs turning in the socket, particularly after being secured by screwing the nut up tight; third, by holding the shank and knob firmly together regardless of friction; and, fourth, by further securing the shank to knob by means of the screw $b$, as above described.

The above-described combinations of fastening knobs to shanks are deemed amply sufficient to render any liability of their turning in their sockets impossible without destroying the knob. In case of the breaking of a knob, or the disfigurement of the same from any cause, it may be detached from the metallic shank and a new one applied without any difficulty whatever. In lieu of the nut E a rivet may be employed, but the nut would be preferable.

Having thus described my invention, I claim as new, and desire to secure by Letters Patent—

The metallic shank B, provided with the socket C, in connection with the nut E, or its equivalent, and the knob D, all arranged substantially in the manner as and for the purpose set forth.

D. B. COBB.

Witnesses:
WM. F. MCNAMARA,
ALEX. F. ROBERTS.